United States Patent
Bhongale et al.

(10) Patent No.: US 10,012,759 B2
(45) Date of Patent: Jul. 3, 2018

(54) DOWNHOLE SENSING USING PARAMETRIC AMPLIFICATION WITH SQUEEZED OR ENTANGLED LIGHT FOR INTERNAL MODE INPUT

(71) Applicant: HALLIBURTON ENERGY SERVICES, INC., Houston, TX (US)

(72) Inventors: Satyan G. Bhongale, Cypress, TX (US); Christopher L. Stokely, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/118,071

(22) PCT Filed: Mar. 20, 2014

(86) PCT No.: PCT/US2014/031372
§ 371 (c)(1),
(2) Date: Aug. 10, 2016

(87) PCT Pub. No.: WO2015/142347
PCT Pub. Date: Sep. 24, 2015

(65) Prior Publication Data
US 2016/0363690 A1    Dec. 15, 2016

(51) Int. Cl.
  *G01V 5/08*  (2006.01)
  *G01V 8/02*  (2006.01)
  *E21B 47/12*  (2012.01)
  *G02F 1/39*  (2006.01)

(52) U.S. Cl.
  CPC ............. *G01V 8/02* (2013.01); *E21B 47/123* (2013.01); *G02F 1/39* (2013.01); *G01V 2210/1429* (2013.01); *G02F 2001/392* (2013.01)

(58) Field of Classification Search
  CPC ..................... G01V 2210/1429; G01V 8/24
  See application file for complete search history.

(56) References Cited

U.S. PATENT DOCUMENTS

| | | |
|---|---|---|
| 5,939,717 A | 8/1999 | Mullins |
| 6,350,986 B1 | 2/2002 | Mullins et al. |
| 7,280,214 B2 | 10/2007 | DiFoggio et al. |

(Continued)

FOREIGN PATENT DOCUMENTS

WO    2015/142347    9/2015

OTHER PUBLICATIONS

Zhang et al., "Experimental generation of bright two-mode quadrature squeezed light from a narrow-band nondegenerate optical parametric amplifier," 2000, Physical Review A, vol. 62, pp. 023813-1 to 023813-4.*

(Continued)

*Primary Examiner* — Kiho Kim
(74) *Attorney, Agent, or Firm* — Gilliam IP PLLC

(57) ABSTRACT

A downhole sensing system includes an optical sensor that provides a light signal with at least one attribute related to a downhole parameter. The system also includes a parametric amplification module that amplifies the light signal using squeezed or entangled light for internal mode input. The system also includes a processing unit that determines a value for the downhole parameter based on the amplified light signal.

12 Claims, 4 Drawing Sheets

(56) References Cited

U.S. PATENT DOCUMENTS

| | | | | |
|---|---|---|---|---|
| 2003/0169956 A1* | 9/2003 | Lange | ............ | G01B 11/16 385/12 |
| 2004/0067002 A1* | 4/2004 | Berg | ............ | G01V 11/00 385/12 |
| 2009/0097015 A1* | 4/2009 | Davies | ............ | G01K 11/32 356/73.1 |
| 2010/0044103 A1* | 2/2010 | Moxley | ............ | E21B 7/14 175/16 |

OTHER PUBLICATIONS

Jin et al., "Alleviation of additional phase noise in fiber optical parametric amplifier based signal generator," 2012, Optics Express, vol. 20, No. 24, 9 pages.*

Caves, Carlton M., "Quantum limits on noise in linear amplifiers", The American Physical Society, Physical Review D, Third Series, vol. 26, No. 8, , Particles and Fields, Oct. 15, 1982, p. 1817-1839.

Walls, D.F. et al., "Quantum Optics," Second Edition, Springer-Verlag, Berlin, pp. 171-173 (2008).

Mehmet, Moritz et al., "Squeezed Light at 1150nm with a Quantum Noise Reduction of 12.3 dB," Optic Express, vol. 19, No. 25, Dec. 5, 2011, pp. 25763-25772.

Vahlbruch, Henning et al., "Observation of Squeezed Light with 10-dB Quantum-Noise Reduction," The American Physical Society, Physical Review Letters, PRL 100, 033602, Jan. 25, 2008, pp. 2-4.

Ou Z.Y., "Quantum Amplification with Correlated Quantum Fields," The American Physical Society, Physical Review A, vol. 48, No. 3, Rapid Communications, Sep. 1993, p. R1761-R1764.

Ou Z.Y. et al., "Quantum Noise Reduction in Optical Amplification," The American Physical Society, Physical Review Letters, vol. 70, No. 21, May 24, 1993, p. 3239-3242.

Kong, Jia et al., "Cancellation of Internal Quantum Noise of an Amplifier by Quantum Correlation," The American Physical Society, Physical Review Letters, PRL 111, 033608, Jul. 19, 2013, p. 033608-1-033608-5.

PCT International Search Report and Written Opinion, dated Nov. 25, 2014, Appl No. PCT/US2014/31372, "Downhole Sensing Using Parametric Amplification with Squeezed or Entangled Light for Internal Mode Input," Filed Mar. 20, 2014, 9 pgs.

* cited by examiner

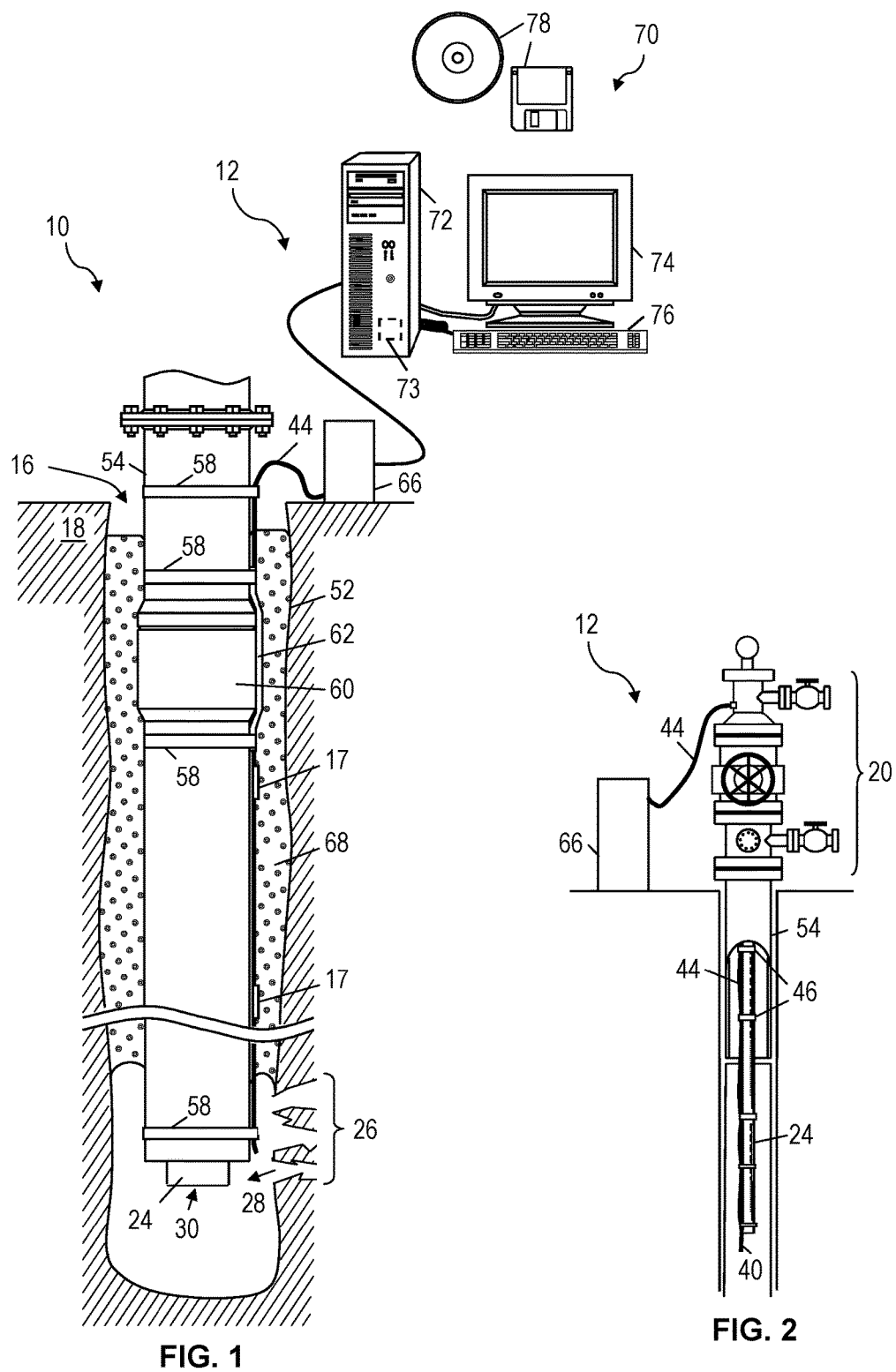

DOWNHOLE SENSING USING PARAMETRIC AMPLIFICATION WITH SQUEEZED OR ENTANGLED LIGHT FOR INTERNAL MODE INPUT

BACKGROUND

Distributed optical sensing technology is proving to be suitable for a number of downhole oil and gas applications ranging from temperature sensing to passive seismic monitoring. One particularly advantageous aspect of this technology is that it enables the downhole components of the system to be passive, i.e., the electronics can be kept at the surface and not in the wellbore. As the technology evolves to develop new and improved systems with increased performance and sensitivity, certain obstacles have been encountered. For example, fiber optic distributed sensing techniques often rely on (but do not necessarily require) monitoring the backscattered component of light injected into an optical fiber. The properties of this backscattered light (e.g., phase, spectrum, amplitude, etc.) can provide access to various downhole parameters, such as the temperature at a specific location of the fiber. However, as the length of the fiber increases, the injected light and backscattered light suffers from increased attenuation from various loss mechanisms. This attenuation can be compensated through the use of a high power laser source for light injection. However, this approach is limited since for every fiber there exists a threshold value of laser power beyond which nonlinear behavior starts to add unwanted features. Therefore, very weak signals can be commonplace in some distributed optical sensing systems, and extracting information from the signals is a challenging task.

When working with very weak signals, measurement noise such as noise introduced by the sensor, receiver electronics, and other unavoidable noise sources, becomes a prominent issue. For very long optical fibers, such as those deployed in ultra-deep/ultra-long oil and gas boreholes, the signals could be very weak (not more than few photons). Existing systems cannot perform adequately in this regime as they lack proper handling and understanding of weak signals and/or noise. Weak signals at the level of a few photons (e.g., the noise as well as the signal) acquire non-classical (Quantum) properties.

BRIEF DESCRIPTION OF THE DRAWINGS

Accordingly, there are disclosed in the drawings and the following description various downhole sensing systems and methods employing parametric amplification. In the drawings:

FIG. 1 shows an illustrative downhole optical sensor system in a production well.

FIG. 2 shows an alternative downhole optical sensor system embodiment.

Figure 3:
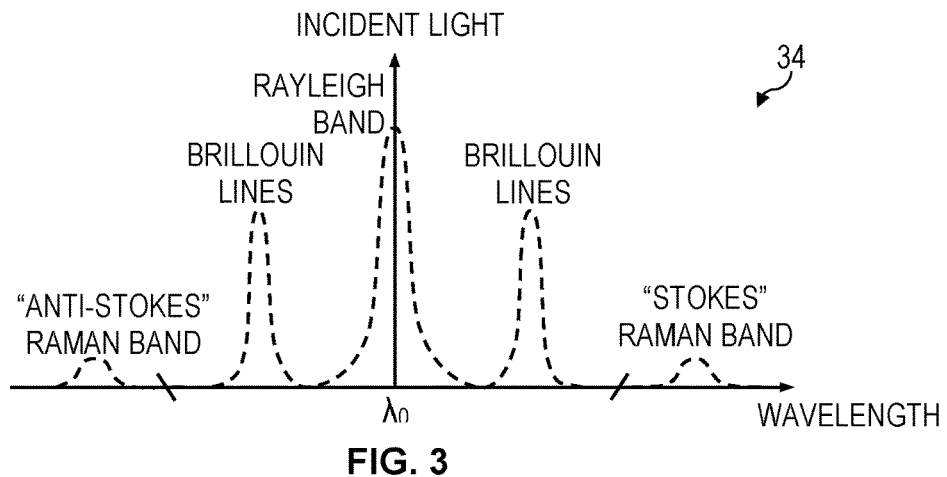
FIG. 3 shows a graph illustrating optical intensity versus wavelength for various forms of optical backscattering.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The obstacles outlined above are at least in part addressed by the disclosed sensing systems and methods employing amplification without compromising SNR by exploiting specific operating regimes of more than one inter-coupled parametric amplifiers. As an example, a sensing system may include an optical sensor that provides a light signal with at least one attribute related to a downhole parameter. The sensing system also includes a parametric amplifier module that amplifies the light signal. The sensing system may also include a processing unit that determines a value for the downhole parameter based on the amplified light signal. For example, an amplified light signal may be converted to an electrical signal and stored in memory. The processing unit may access the memory to retrieve stored data associated with the amplified light signals and to determine a value for the downhole parameter. As an example, in distributed temperature sensing (DTS), Raman Stokes and Anti-Stokes components of the backscattered light are processed to determine the downhole temperature with high accuracy. In some scenarios, the improved signal-to-noise ratio (SNR) provided by the disclosed parametric amplification method enables a significant reduction in the time duration over which the sensor data is required to be averaged, an increase in the sensing reach (e.g., the length and/or depth of the borehole at which sensing is performed), and/or a decrease in the allowed intensity of the light source compared to sensing systems without parametric amplification.

In at least some sensing system embodiments, particularly distributed sensing ones, source light is modulated to enable downhole information to be associated with specific positions along a sensing fiber. For example, pulse modulation can be employed for this purpose. The time of arrival of the backscattered light determines the spatial location from where the light is backscattered. Also, in at least some sensing system embodiments, reflective terminators and/or circulators may be employed to reduce the number of downhole components.

In at least some sensing system embodiments, optical fibers are used to provide optical beam paths between different components. Intrinsic impurities distributed along the length of the fiber backscatter some portion of the light, thus acting as a continuum of virtual mirrors and enabling the fiber itself to act as the sensor. The time-of-flight of the backscattered light determines the location of the virtual mirror, thereby enabling the fiber to be analytically divided into many definite, finite spatial regions. The parameter to be measured affects the physical properties in each such spatial region of the fiber causing a phase shift of light travelling through it. In such embodiments, the receiver measures the phase shifts to monitor the measurement parameter in each spatial region.

The disclosed techniques are best understood in an application context. Turning now to the figures, FIG. 1 shows a well 10 equipped with an illustrative embodiment of a downhole optical sensor system 12 with which parametric amplification may be employed. A drilling rig has been used to drill and complete the well 10 in a typical manner, with a casing string 54 positioned in the borehole 16 that penetrates into the earth 18. The casing string 54 includes multiple tubular casing sections (usually about 30 feet long)

connected end-to-end by couplings 60. (FIG. 1 is not to scale. Typically the casing string includes many such couplings.) Within the well 10, a cement slurry 68 has been injected into the annular space between the outer surface of the casing string 54 and the inner surface of the borehole 16 and allowed to set. A production tubing string 24 has been positioned in an inner bore of the casing string 54.

The well 10 is adapted to guide a desired fluid (e.g., oil or gas) from a bottom of the borehole 16 to a surface of the earth 18. Perforations 26 have been formed at a bottom of the borehole 16 to facilitate the flow of a fluid 28 from a surrounding formation into the borehole and thence to the surface via an opening 30 at the bottom of the production tubing string 24. Note that this well configuration is illustrative and not limiting on the scope of the disclosure.

The downhole optical sensor system 12 includes an interface 66 coupled to a fiber optic cable 44 for distributed downhole sensing. The interface 66 is located on the surface of the earth 18 near the wellhead, i.e., a "surface interface". In the embodiment of FIG. 1, the fiber optic cable 44 extends along an outer surface of the casing string 54 and is held against the outer surface of the of the casing string 54 at spaced apart locations by multiple bands 46 that extend around the casing string 54. A protective covering 62 may be installed over the fiber optic cable 44 at each of the couplings 60 of the casing string 54 to prevent the cable 44 from being pinched or sheared by the coupling's contact with the borehole wall. The protective covering 62 may be held in place, for example, by two of the bands 46 installed on either side of coupling 60.

In at least some embodiments, the fiber optic cable 44 terminates at surface interface 66 with an optical port adapted for coupling the fiber(s) in cable 44 to a light source and a detector. The light source transmits light pulses along the fiber optic cable 44, which contains scattering impurities. As each pulse of light propagates along the fiber, some of the pulse is scattered back along the fiber from every point on the fiber. The optical port communicates the backscattered light to the detector. As will be explained in greater detail below, the detector responsively produces electrical measurements from backscattered light attributes (e.g., phase shift) corresponding to different points along the fiber 44. In at least some embodiments, the detector may comprise an interferometer to measure, for example, the phase shift. From the light attributes, the value of a downhole parameter sensed by the fiber at the location of the back-reflection or backscatter is determined. As described here, the light is reflected back by impurities along the entire length of the fiber. Thus the entire fiber acts as a sensor—a distributed sensor.

The illustrative downhole optical sensor system 12 of FIG. 1 further includes a computer 70 coupled to the surface interface 66 to control the light source and detector. The illustrated computer 70 includes a chassis 72, an output device 74 (e.g., a monitor as shown in FIG. 1, or a printer), an input device 76 (e.g., a keyboard), and non-transient information storage media 78 (e.g., magnetic or optical data storage disks). However, the computer may be implemented in different forms including, e.g., an embedded computer permanently installed as part of the surface interface 66, a portable computer that is plugged into or wirelessly linked to the surface interface 66 as desired to collect data, and a remote desktop computer coupled to the surface interface 66 via a wireless link and/or a wired computer network. The computer 70 is adapted to receive the electrical measurement signals produced by the surface interface 66 and to responsively determine a distributed parameter such as, e.g., distributed temperature sensing along the length of the casing string, or distributed sensing measurements of acoustic energy, vibrational energy (including active or passive seismic), pressure, strain, deformation, chemical concentrations, nuclear radiation intensity, electromagnetic energy, and/or acceleration (including gravity).

In at least some implementations, the non-transient information storage media 78 stores a software program for execution by computer 70. The instructions of the software program cause the computer 70 to collect phase differences of backscattered light received as an electrical signal from surface interface 66 and, based at least in part thereon, to determine downhole parameter values at each point on the fiber 44. The instructions of the software program may also cause the computer 70 to display information associated with determine downhole parameter values via the output device 74.

FIG. 2 shows an alternative embodiment of downhole optical sensor system 12 having the fiber optic cable 44 strapped to the outside of the production tubing 24 rather than the outside of casing 54. Rather than exiting the well 10 from the annular space outside the casing, the fiber optic cable 44 exits through an appropriate port in the "Christmas tree" 20, i.e., the assembly of pipes, valves, spools, and fittings connected to the top of the well to direct and control the flow of fluids to and from the well. The fiber optic cable 44 extends along the outer surface of the production tubing string 24 and is held against the outer surface of the of the production tubing string 24 at spaced apart locations by multiple bands 46 that extend around the production tubing string 24. The downhole optical sensor system 12 of FIG. 2 optionally includes a hanging tail 40 at the bottom of a borehole 16. In other system embodiments, the fiber optic cable 44 may be suspended inside the production tubing 24 and held in place by a suspended weight on the end of the fiber.

FIG. 3 shows a graph 34 that is a schematic spectrum of light transmitted and/or backscattered in an optical fiber. At the center of the abscissa is the wavelength $\lambda_0$ of the light initially launched into the waveguide. Rayleigh backscattering has the highest intensity and is centered at the wavelength $\lambda_0$. Rayleigh backscattering is due to microscopic inhomogeneities of refractive index in the waveguide material matrix. Note that Raman backscattering (which is due to thermal excited molecular vibration known as optical phonons) has an intensity which varies with temperature T, whereas Brillouin backscattering (which is due to thermal excited acoustic waves known as acoustic phonons) has a wavelength which varies with both temperature T and strain $\varepsilon$. Detection of Raman backscattering is typically used in DTS systems, due in large part to its direct relationship between temperature T and intensity, and almost negligent sensitivity to strain $\varepsilon$.

However, the Raman backscattering intensity is generally significantly less than that of Rayleigh or Brillouin backscattering, giving it a correspondingly lower signal-to-noise ratio. Consequently, it is common practice to sample the Raman backscattering many times and digitally average the readings, which results in an effective sample rate of from tens of seconds to several minutes, depending on the desired signal-to-noise ratio, fiber length and desired accuracy. While the effective sample rate is generally too slow to accurately track fast moving fluid in a wellbore, the disclosed sensing techniques employ parametric amplification to improve SNR or otherwise facilitate faster measurements and/or longer reach measurements.

Before proceeding, a few remarks about the quantum nature of light are in order. Light energy is transported by photons, which have the properties of both particles and waves as set forth by the principles of quantum mechanics. The behavior of photons and other fundamental particles can be expressed in terms of a "wavefunction" which is a probabilistically-weighted combination of multiple states called eigenstates. Within quantum mechanics, a property to be measured is represented by an operator that is a matrix of size N×N, where N is the number of orthogonal states of the particle/photon that when operated on produces a number called the eigenvalue. Thus, when measurement is performed on a general wavefunction a probability weighted sum over the eigenvalues may be produced to give an averaged value. If multiple properties are to be measured, it is often the case that the outcome is affected by the order in which the measurements are performed, i.e., the corresponding operators are not commutative. For certain pairs of properties, e.g., position and momentum, energy and time, amplitude and phase, there is a residual uncertainty originating from this non-commutivity that cannot be eliminated. The most famous expression of this is the Heisenberg uncertainty principle, relating the minimum uncertainly in measurement of position x, and momentum p, given by $\Delta x$ and $\Delta p$ respectively:

$$\Delta x \Delta p \geq h/4\pi$$

Figure 4A:
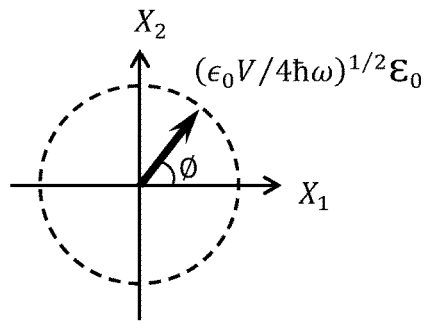
FIGS. 4A-4F explain certain squeezed states for light.
Figure 4B:
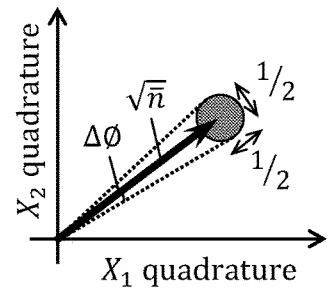

Such pairs of properties may be referred to as conjugate quadrature components, conjugate variables, or when used in context, simply as quadratures. For our purposes here, the relevant conjugate variables are amplitude (i.e., number of photons n) and phase $\phi$.

Where the number of photons is large enough for a light beam to be represented classically, the state of the light at a given time and position can be expressed as an exact phasor as shown in FIG. 4A, with a definite phase $\phi$ and a definite amplitude $$\left(\frac{\epsilon_0 V}{4\hbar\omega}\right)^{\frac{1}{2}} E_0,$$

where $E_0$ is the electric field amplitude, $\omega$ is the frequency, $\epsilon_0$ is the permittivity, and V is the quantization volume. The phase changes with time or position so that the phasor rotates through the quadratures. As indicated in FIG. 4B, however, as the number of photons n decreases, the region of uncertainty at the end of the phasor starts to become significant compared to the length. The phasor has an amplitude uncertainty and a phase uncertainty such that $$\Delta n \Delta \phi \geq \frac{1}{4}$$

The state of coherent laser light $|\alpha\rangle$ may be expressed as a superposition of photon number states $|n\rangle$ with state probability $|\alpha^n/\sqrt{n!}|^2$:

$$|\alpha\rangle = \sum_{n=1}^{\infty} \frac{\alpha^n}{(n!)^{\frac{1}{2}}} |n\rangle$$

The mean photon number is $[n]=|\alpha|^2$, with $\alpha$ representing the complex amplitude. With this we can easily define the spread in the number of photons about the mean value $[n]$ as $\Delta n=[n]^{1/2}$ and a resulting minimum phase spread of $$\Delta \phi_{min} = \frac{1}{4[n]^{\frac{1}{2}}}$$

As the mean photon number grows larger, the phase uncertainty approaches the classical case.

Figure 4C:
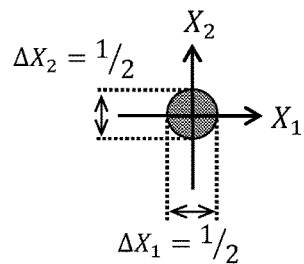
Figure 4D:
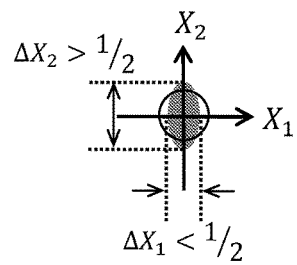
Figure 4E:
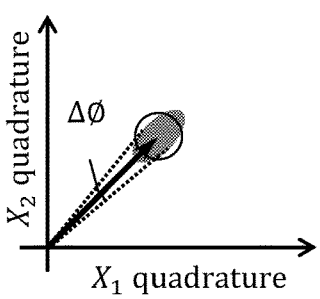
Figure 4F:
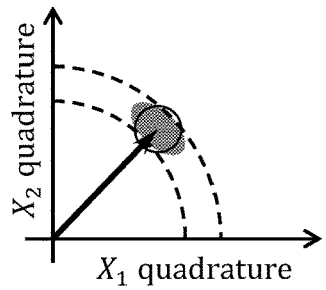

FIG. 4C shows the intrinsic uncertainty of the so-called "vacuum state" which has a mean photon number of 0. The intrinsic uncertainty of this state is symmetric, i.e., the uncertainty is shared equally between both conjugate variables. This situation may be contrasted with the squeezed vacuum state of FIG. 4D, in which the reduced uncertainty of one conjugate variable is achieved at the expense of an increased uncertainty in the other. Such squeezing can also be achieved with non-vacuum states. FIG. 4E represents light in a phase-squeezed state, while FIG. 4F represents light in an amplitude-squeezed state.

The squeezed states of light described above maybe considered as elements of a more general class of light states sometimes referred to as "correlated light." In some contexts, squeezed states of light are also referred to as two-photon entangled states or simply entangled states. However, the set of entangled states is broad and includes numerous types of states besides these squeezed states of light.

The disclosed amplification method, employs squeezed states and entangled states for amplifying weak signal involved in downhole sensing, and oil and gas industry in general wherever weak optical signals is an issue.

A number of squeezed light generation techniques are provided in the literature. See, e.g., D. F. Walls and G. J. Milburn, *Quantum Optics* (2$^{nd}$ Ed), Springer-Verlag, Berlin, pp 171-173 (2008); M. Mehmet et al., "Squeezed light and 1550 nm with a quantum noise reduction of 12.3 dB", Optics Express 19, 25763 (2011); M. Metmet et al., "Observation of Squeezed Light with 10-dB Quantum-Noise Reduction", Phys. Rev. Lett. 100, 033602 (2008); Luc Boivin, *Squeezing in Optical Fibers*, Ph.D. Thesis, MIT (1996); and related references therein. As explained in these references, non-classical states of light, such as squeezed light, can be and have been generated through the use of processes such as optical parametric amplification, parametric oscillation, second harmonic generation, and nonlinear propagation through optical elements with, for example, Kerr nonlinearities. (This last technique enables the squeezing to occur within the fiber of a fiber optic sensing system.) As described in the second reference above, light squeezing has been demonstrated for 1550 nm laser light. This wavelength falls within the telecommunications band, enabling the use of standard fibers to provide minimal transmission loss per kilometer. The references show that squeezing factors of 10 dB are possible, which should translate to a 10 dB reduction in the quantum noise level. Such a SNR improvement is equivalent to increasing the signal power by a factor of 10.

Figure 5:
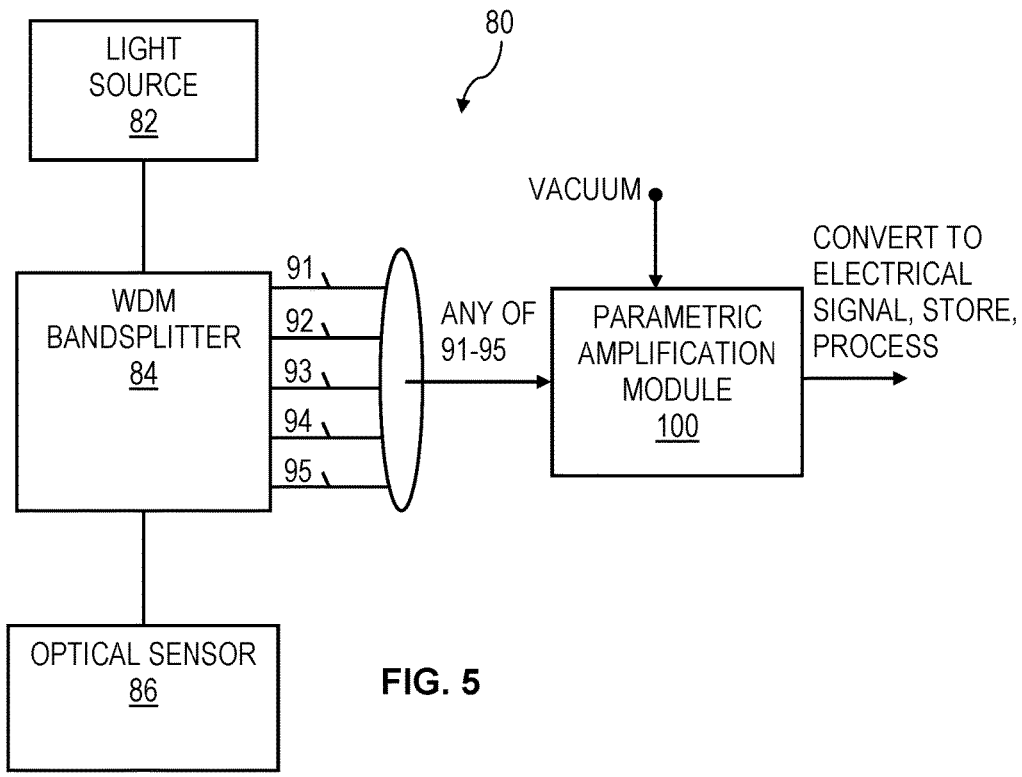
FIG. 5 shows a block diagram of an illustrative downhole sensing system.

FIG. 5 shows a block diagram of an illustrative downhole sensing system 80. For example, the system 80 may correspond to part of a DTS system or other distributed sensing system. In FIG. 5, the various components may be coupled via optical fibers or other waveguides. Further, at least one reference fiber coil may be used as a reference point for collected measurements. As shown, the system 80 includes a light source 82 coupled to a wavelength division multiplexing (WDM) bandsplitter 84 and an optical sensor (e.g., a fiber) 86. The WDM bandsplitter 84 operates to pass, split, and/or combine light signals and may provide different outputs at different ports. For example, the WDM bandsplitter 84 may pass light signals from the light source 82 to the optical sensor 86. The optical sensor 86 receives the source light and outputs a light signal having at least one attribute related to a downhole parameter (e.g., temperature, vibration, etc.). For example, the output from the optical sensor 86 may correspond to backscattered light as described herein. The output from the optical sensor 86 is received by the WMD bandsplitter 84, which may output a Rayleigh component 91, Brillouin components 92, 93, and/or Raman Stokes components 94, and Raman Anti-Stokes component 95. For example, each of the components 91-95 may be output from a different port of WDM bandsplitter 84. In some embodiments, the light splitter/combiner functions and the optical spectrum separator functions of the WDM bandsplitter 84 may be divided into different components As shown, a parametric amplification module 100 receives any of components 91-95. If more than one of the components is to be amplified, multiple parametric amplifier modules may be used (e.g., one for each of the components to be amplified). The parametric amplification module 100 also receives a vacuum signal. The output of the parametric amplification module 100 is provided to a surface interface (e.g., interface 66) and is converted to an electrical signal for storage and processing.

Figure 6A:
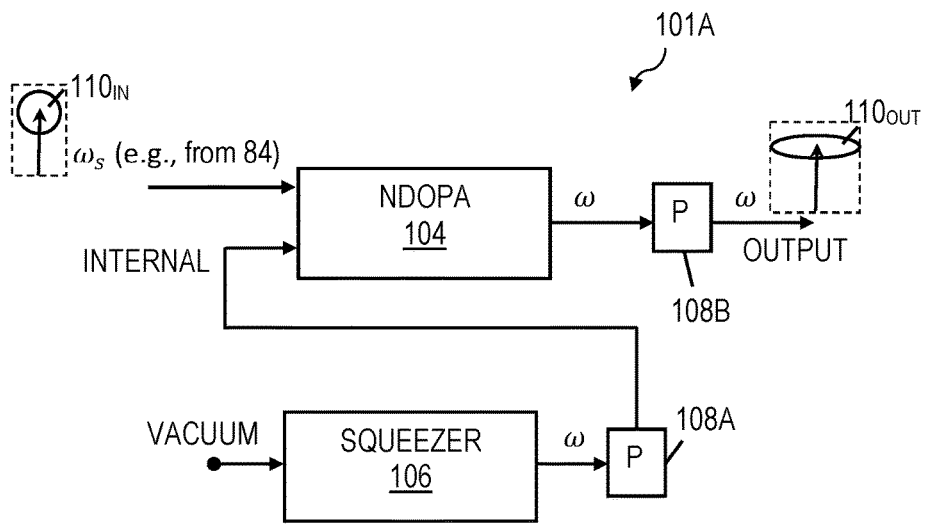
FIGS. 6A and 6B show block diagrams of illustrative parametric amplification configurations.
Figure 6B:
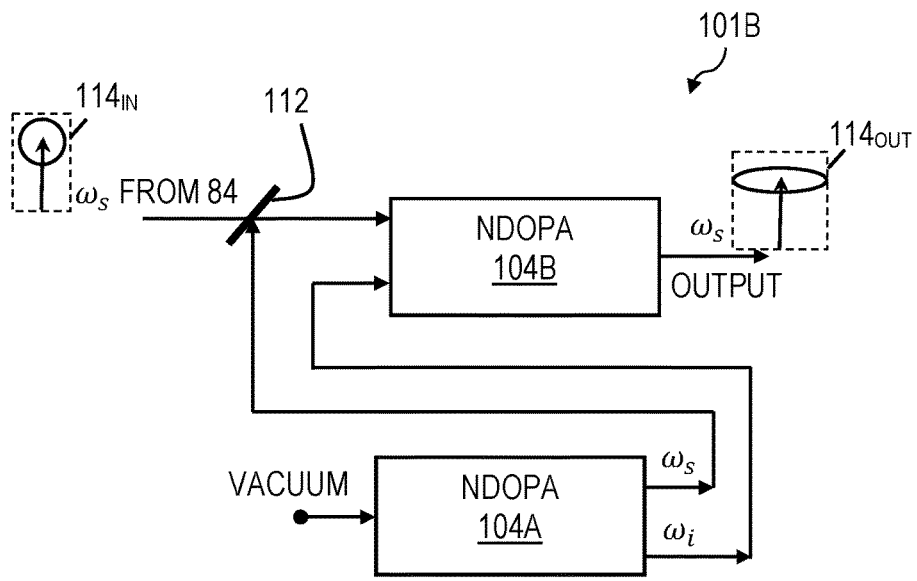

FIGS. 6A and 6B show block diagrams of illustrative parametric amplification configurations. The configuration 101A of FIG. 6A is an example of a squeezed internal mode configuration, while the configuration 101B of FIG. 6B is an example of a correlated signal and internal mode configuration. Before proceeding, a general description of parametric amplification theory and some of the components used in the configurations 101A and 101B are in order.

Typically, any signal amplification will amplify the accompanying noise. In addition, the process of amplification will typically add noise and thus degrade the SNR. This is not a fundamental limitation that cannot be overcome in principle since extra noise arises from internal degrees of freedom associated with the amplifier itself. The disclosed configurations 101A and 101B use the principle of "squeezed light," and/or "entangled light" and the configurations may be used independently or possibly together. For the squeezed internal mode configuration 101A, the amplification is configured such that the any extra noise is added in the conjugate quadrature variable to the signal attribute of interest. For example, in DTS, the returned amplitude of the Raman signal is the signal attribute of interest. Amplitude and phase are conjugate quadrature variables. Thus, one can configure the amplifier to add any extra noise in the phase quadrature while reducing noise in the amplitude quadrature. For the correlated signal and internal mode configuration 101B, the amplification is configured such that internal amplifier-degrees of freedom, rather than left independent are quantum correlated with the signal. Hence, in essence, no new/extra amplifier noise is added during amplification.

The following theoretical description is well known to those skilled in the art of quantum optics. The basic quantum mechanical equation for phase insensitive amplification of photons can be written as:

$$\hat{\alpha}_{out} = \sqrt{G}\hat{\alpha}_{in} + \hat{F}, \quad \text{Equation (1)}$$

where $\hat{\alpha}_{out}$ is the output signal, $\hat{\alpha}_{in}$ is the input signal, G is the amplifier gain, and F is related to the internal modes of the amplifier satisfying the commutation relation $[\hat{F}, \hat{F}^\dagger]=1-G$. See e.g., Mark Fox, *Quantum Optics*, Oxford University Press. Using the definition:

$$SNR = \frac{\text{(signal amplitude)}^2}{\text{(noise amplitude)}^2} = \frac{\langle I \rangle^2}{\langle \Delta I^2 \rangle} = \frac{\bar{n}^2}{(\Delta n)^2}, \quad \text{Equation (2)}$$

where n is the photon number, then for a coherent state with Poisson statistics $\Delta n = \sqrt{\bar{n}}$. Thus, the noise figure of the amplifier can be shown to be:

$$\text{noise figure} = \frac{SNR_{in}}{SNR_{out}} = 2 - \frac{1}{G}, \quad \text{Equation (3)}$$

Thus, a high gain amplifier typically degrades the SNR by a factor of 2 (+3d B). While the extra noise added by the amplifier cannot be avoided, it can be rearranged, according to the Caves' amplifier uncertainly principle given as:

$$(A_1 A_2)^{1/2} \geq |1 - G^{-1}|/4, \quad \text{Equation (4)}$$

where $A_i = (\Delta F_i)^2/G$. Thus, the extra noise in one quadrature-phase amplitude where the signal is encoded can be suppressed while the extra noise is mostly coupled to the unused conjugate quadrature, so long as their product satisfies the above lower bound given above. See e.g., C. Caves, Phys. Rev. D Vol. 26, 1817 (1992). The squeezed internal mode configuration 101A relies on this concept. Meanwhile, the theory behind the correlated signal and internal mode configuration 101B is that, since the internal mode is correlated with the signal, very little extra independent additive noise is introduced.

Parametric amplification is based on various types of nonlinear optical devices. The term "parametric" refers to an optical process in a nonlinear medium where there is no transfer of energy, momentum, or angular momentum between the optical field and physical system. A few examples of parametric optical processes are second harmonic generation, difference frequency generation, optical parametric amplification, optical parametric oscillation, optical Kerr effects, four-wave mixing, spontaneous parametric downconversion, etc. Example parametric amplifiers include degenerate optical parametric amplifiers (DOPAs), spontaneous optical parametric downconverters (SOPDCs), and non-degenerate optical parametric amplifiers (NDOPAs).

DOPAs include a nonlinear medium (e.g., a crystal), pumped by an intense laser at frequency $2\omega$. The pumped nonlinear medium acts as a phase-sensitive amplifier for signal modes at frequency $\omega$. When a vacuum mode is used instead of a traditional signal as an input to a DOPA, then the DOPA becomes a SOPDC. With SOPDCs, the vacuum mode produces a quadrature-squeezed vacuum state. A squeezed vacuum state has the property that the noise in one quadrature (e.g., amplitude) is reduced at the cost of increasing the noise in the orthogonal phase quadrature. NDOPAs have an additional output, compared to DOPAs, called the internal mode or idler signal. The frequency of the signal, $\omega_s$, and that of the internal mode, $\omega_i$, are related such that $\omega_{pump} = 2\omega = \omega_s + \omega_i$. The two beams coming out of a NDOPA are quantum entangled. This means that performing any measurement on one of the beams affects the other, even if they are spatially separated. Entanglement is a completely quantum concept and does not occur in classical systems. The above parametric amplifier examples are commercially available and/or can be devised in the laboratory by well understood and documented techniques.

Returning to FIG. 6A, the squeezed internal mode configuration 101A is achieved by using the output of an SOPDC or squeezer 106 as the internal input mode for NDOPA 104. The NDOPA 104 also receives light signal $\omega_s$ (e.g., from WDM bandsplitter 84) as input. Polarizers 108A and 108B are used to pick out a specific polarization, since the squeezer 106 and NDOPA 104 are operated in a frequency degenerate but polarization non-degenerate mode. It has been demonstrated experimentally that a squeezed internal mode configuration such as configuration 101A provides an SNR improvement of 0.5 dB for a small coherent field input. See e.g., Z. Y. Ou, S. F. Pereira, and H. J. Kimble, Phys. Lett. Vol. 70, 3239 (1993). Though the improvement is not significant, this proves that it is possible to improve SNR by harnessing non-classical states of light. The dashed box 110$_{IN}$ illustrates the signal strength and noise at the input with the size of its arrow and circle respectively. Meanwhile, the dashed box 110$_{OUT}$ illustrates the signal strength and noise at the output with the size of its arrow and circle respectively.

For the correlated signal and internal mode configuration 101B of FIG. 6B, the two beams coming out of NDOPA 104A are spatially separated and are used as the signal and the internal mode of the NDOPA 104B. The two beams output from NDOPA 104A are quantum entangled, hence their measurements are correlated. This implies that measurement noise related to the signals output from the NDOPA 104A is also correlated and not independent. The signal mode is also encoded with the input signal, $\omega_s$ (e.g., from WDM bandsplitter 84), using a beam splitter or interferometer 112. It has been demonstrated experimentally that a correlated signal and internal mode configuration such as configuration 101B provides amplification with up to 4 dB improvement in SNR while the signal is amplified by 4.5 dB. See e.g., J. Kong, F. Hudelist, Z. Y. Ou, and W. Zhang, Phys. Rev. Lett. Vol. 111, 033608 (2013). The dashed box 114$_{IN}$ illustrates the signal strength and noise at the input with the size of its arrow and circle respectively. Meanwhile, the dashed box 114$_{OUT}$ illustrates the signal strength and noise at the output with the size of its arrow and circle respectively.

In at least some embodiments, the disclosed parametric amplification techniques can be implemented with existing distributed sensing systems. As described herein, a distributed sensing system may include a fiber deployed along the length of the wellbore, or more generally along a spatial region where a downhole parameter is to be measured. A laser pulse injected from one end of the fiber undergoes backscattering from numerous points in the fiber. Thus, the time of the return signal provides information about the location from where it is backscattered. For DTS, spectral decomposition of the backscattered signal contains information about the vibrational motion of the molecules in the fiber or other attributes. Since molecular motion is little more than kinetic energy, which in turn is simply temperature, the Raman peaks—Stokes and Anti-Stokes—are a direct probe of temperature. It can be shown that the ratio of Anti-Stokes to Stokes intensity is proportional to temperature.

Although obtaining DTS measurements appears straightforward, the technique may be difficult to experimentally realize or implement because the returned backscattered Raman signals are very, very weak. Additionally, the weight of the signal in the sidebands (Stokes and Anti-Stokes) is a fraction of the total received signal. Moreover, with increasing depth of measurement, the quality of backscattered signal degrades substantially due to optical fading. The disclosed parametric amplification is aptly suited for DTS, and offers an improvement of 4.0 dB in SNR which amounts to a step change improvement in DTS technology. Further, DTS is just one of many applications that can benefit from parametric amplification. For example, even for distributed acoustic sensing (DAS), the depth of measurement is limited due to optical fading. Also, performing DAS at higher spatial resolution requires smaller pulse width implying smaller photon number. Again, the disclosed parametric amplification could enhance the SNR in such cases. In general, amplification without degrading SNR, can extend the applicability range of optics based metrology, be it chemical sensing, gravity measurements, strain sensing, etc.

Figure 7:
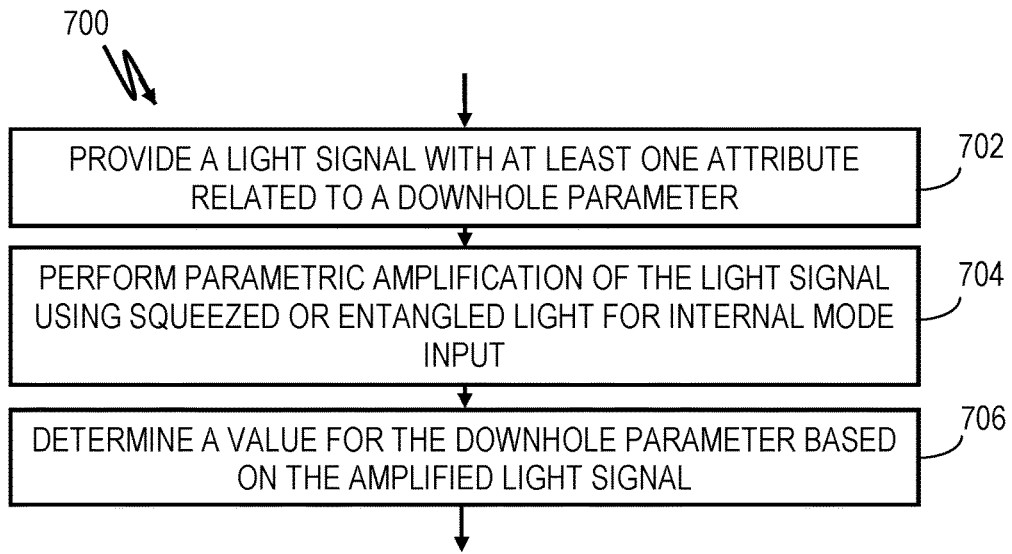
FIG. 7 is a flowchart of an illustrative downhole sensing method.

FIG. 7 is a flowchart of an illustrative downhole sensing method 700. As shown, the method comprises providing a light signal with at least one attribute related to a downhole parameter (block 702). As an example, the light signal may include a Raman backscattering component provided by a DTS fiber in a downhole environment. At block 704, parametric amplification of the light signal is performed. In some embodiments, the parametric amplification step of block 704 includes inputting the light signal and a squeezer output to a NDOPA as described, for example, in the squeezed internal mode configuration 101A. Further, the parametric amplification step of block 704 may include polarizing the squeezer output and an output of the NDOPA. Additionally or alternatively, the parametric amplification step of block 704 may include outputting quantum entangled signals from a first NDOPA, and inputting one of the quantum entangled signals and an encoded version of the light signal to a second NDOPA. The encoded version of the light signal from the sensor may be obtained, for example, using interferometry or beam splitting. At block 706, a value is determined for the downhole parameter based on the amplified light signal.

In at least some embodiments, the method 700 includes additional or alternative steps. For example, the method 700 may additionally include dividing the light signal into multiple components, and amplifying one or more of the multiple components. Further, the method 700 may include adjusting a light source power level and/or a depth of measurement in accordance with the parametric amplification.

Embodiments disclosed herein include:

A: A downhole sensing system that comprises an optical sensor that provides a light signal with at least one attribute related to a downhole parameter, a parametric amplification module that amplifies the light signal, and a processing unit that determines a value for the downhole parameter based on the amplified light signal.

B: A downhole sensing method comprises providing a light signal with at least one attribute related to a downhole parameter, performing parametric amplification of the light signal, and determining a value for the downhole parameter based on the amplified light signal.

Each of the embodiments, A and B may have one or more of the following additional elements in any combination: Element 1: the parametric amplification module has a squeezed internal mode configuration. Element 2: the squeezed internal mode configuration includes a non-degenerate optical parametric amplifier (NDOPA) and a squeezer, wherein the NDOPA receives the light signal and an output from a squeezer as inputs. Element 3: the squeezed internal mode configuration further includes polarizers at the outputs of the squeezer and the NDOPA. Element 4: the parametric amplification module has a correlated signal and internal mode configuration. Element 5: the correlated signal and internal mode configuration includes first and second non-degenerate optical parametric amplifiers (NDOPAs), wherein the first NDOPA outputs quantum entangled signals, and wherein the second NDOPA amplifies the light signal based on one of the quantum entangled signals and an encoded version of the light signal. Element 6: the correlated signal and internal mode configuration includes an interferometer or beam splitter to provide the encoded version of the light signal. Element 7, the optical sensor corresponds to an optical fiber to perform distributed temperature sensing (DTS) in a downhole environment based on Raman backscattering. Element 8, the optical sensor corresponds to an optical fiber to perform distributed acoustic sensing (DAS) in a downhole environment based on Raleigh backscattering. Element 9, further comprising a wavelength division multiplexing (WDM) bandsplitter between the optical sensor and the parametric amplifier to divide the light signal into multiple components. Element 10, the parametric amplification module amplifies one of the multiple components of the light signal output from the WDM bandsplitter.

Element 11: performing parametric amplification comprises inputting the light signal and a squeezer output to a non-degenerate optical parametric amplifier (NDOPA). Element 12: performing parametric amplification further comprises polarizing the squeezer output and an output of the NDOPA. Element 13: performing parametric amplification comprises outputting quantum entangled signals from a first non-degenerate optical parametric amplifier (NDOPA), and inputting one of the quantum entangled signals and an encoded version of the light signal to a second NDOPA. Element 14: performing parametric amplification further comprises performing interferometry or beam splitting to provide the encoded version of the light signal. Element 15: the light signal includes a Raman backscattering component provided by a distributed temperature sensing (DTS) fiber in a downhole environment. Element 16: furthering comprising dividing the light signal into multiple components. Element 17: furthering comprising amplifying one of the multiple components. Element 18: furthering comprising adjusting at least one of a light source power level and a depth of measurement in accordance with said performing parametric amplification.

Numerous variations and modifications will become apparent to those skilled in the art once the above disclosure is fully appreciated. For example, the figures show system configurations suitable for production monitoring, but they are also readily usable for monitoring treatment operations, cementing operations, active and passive seismic surveys, and reservoir and field activity monitoring. It is intended that the following claims be interpreted to embrace all such variations and modifications.

What is claimed is:

1. A downhole sensing system, comprising:
   an optical sensor that provides a light signal with at least one attribute related to a downhole parameter;
   a parametric amplification module that amplifies the light signal using squeezed or entangled light for internal mode input; and
   a processing unit that determines a value for the downhole parameter based on the amplified light signal;
   wherein the parametric amplification module has a correlated signal and internal mode configuration and wherein the correlated signal and internal mode configuration includes first and second non-degenerate optical parametric amplifiers (NDOPAs), wherein the first NDOPA outputs quantum entangled signals, and wherein the second NDOPA amplifies the light signal based on one of the quantum entangled signals and an encoded version of the light signal.

2. The system of claim 1, wherein the correlated signal and internal mode configuration includes an interferometer or beam splitter to provide the encoded version of the light signal.

3. The system of claim 1, wherein the optical sensor corresponds to an optical fiber to perform distributed temperature sensing (DTS) in a downhole environment based on Raman backscattering.

4. The system of claim 1, wherein the optical sensor corresponds to an optical fiber to perform distributed acoustic sensing (DAS) in a downhole environment based on Raleigh backscattering.

5. The system of claim 1, further comprising a wavelength division multiplexing (WDM) bandsplitter between the optical sensor and the parametric amplifier to divide the light signal into multiple components.

6. The system of claim 5, wherein the parametric amplification module amplifies one of the multiple components of the light signal output from the WDM bandsplitter.

7. A downhole sensing method, comprising:
   obtaining a light signal with at least one attribute related to a downhole parameter;
   performing parametric amplification of the light signal using squeezed or entangled light for internal mode input; and
   determining a value for the downhole parameter based on the amplified light signal;
   wherein performing parametric amplification comprises outputting quantum entangled signals from a first non-degenerate optical parametric amplifier (NDOPA), and inputting one of the quantum entangled signals and an encoded version of the light signal to a second NDOPA.

8. The method of claim 7, wherein performing parametric amplification further comprises performing interferometry or beam splitting to provide the encoded version of the light signal.

9. The method of claim 7, wherein the light signal includes a Raman backscattering component provided by a distributed temperature sensing (DTS) fiber in a downhole environment.

10. The method of claim 7, furthering comprising dividing the light signal into multiple components.

11. The method of claim 10 furthering comprising amplifying one of the multiple components.

12. The method of claim 7, furthering comprising adjusting at least one of a light source power level and a depth of measurement in accordance with said performing parametric amplification.

* * * * *